Aug. 30, 1949.   K. W. COUSE   2,480,555
RELEASING MECHANISM FOR A POWER TAKE-OFF
Filed May 4, 1946   7 Sheets-Sheet 1

Inventor:
Kibbey W. Couse.
By A. D. T. Libby
Attorney.

Aug. 30, 1949.        K. W. COUSE        2,480,555
RELEASING MECHANISM FOR A POWER TAKE-OFF
Filed May 4, 1946        7 Sheets-Sheet 3

Inventor:
Kibbey W. Couse.
By A. D. T. Libby
Attorney.

Aug. 30, 1949.　　　　　K. W. COUSE　　　　　2,480,555
RELEASING MECHANISM FOR A POWER TAKE-OFF
Filed May 4, 1946　　　　　　　　　　　　　　　7 Sheets-Sheet 5

Inventor:
Kibbey W. Couse
By A. D. T. Libby
Attorney.

Patented Aug. 30, 1949

2,480,555

UNITED STATES PATENT OFFICE 2,480,555

RELEASING MECHANISM FOR A POWER TAKE-OFF

Kibbey W. Couse, Newark, N. J.

Application May 4, 1946, Serial No. 667,378

10 Claims. (Cl. 74—242.5)

1

This invention relates to a special type of power take-off structure especially adapted for use in transmitting power from a common source to a plurality of units which may be located in various positions with respect to the output shaft of the source of power.

The improvements to be hereinafter described are especially adapted for use in connection with a source of power that may be kept in continuous operation while the units to be driven therefrom may be released or idled for any purpose desired.

In my application, Serial No. 603,139, filed July 4, 1945 now Patent No. 2,458,255, dated January 4, 1949, I have shown and described releasing means for a power take-off structure which engage the belt only on one side of a diametrical plane and in a relatively small area, whereas in my present case the engagement of the releasing means is such that it engages the belt around approximately one-half the circumference of the driving pulley by forming a complete shield or cage around the driving pulley and entirely free from the pulley. This divides the application of the releasing power over a large arcuate surface and thereby prevents any tendency of the belt to whip, which defect is common in various other types of power take-off structures.

My invention will be readily understood by reference to the annexed drawings which are somewhat schematic in order to better illustrate the principle involved. In the drawings:

Figure 9 is a view similar to Figure 7 but show-

2 ing another step in the process of relocking the drive pulley to the driven pulley.

Referring now to the drawings wherein like numbers refer to corresponding parts in the various views, 1 is a support on which are mounted arms 2 and 3 for carrying a drive shaft 4 of any suitable character and length. The shaft 4 carries a drive pulley 5 which is fastened as by a key 6 to the shaft 4. The pulley 5, as shown in the drawing, has a plurality of grooves to receive V-belts 7, although a flat or even a chain-type belt may be used, but in any case, the belt is generally referred to by the numeral 7. The belt 7 is permanently connected to a driven pulley 8 that is fastened to a driven shaft 9 which may be the shaft of one or more units to be operated by the source of power (not shown) connected to the drive shaft 4. The driven shaft 9 is supported by standards or arms 10 and 11 which are fastened to a support plate or platform 12 that is pivoted at 13 to a part of the support 1.

Figure 1:
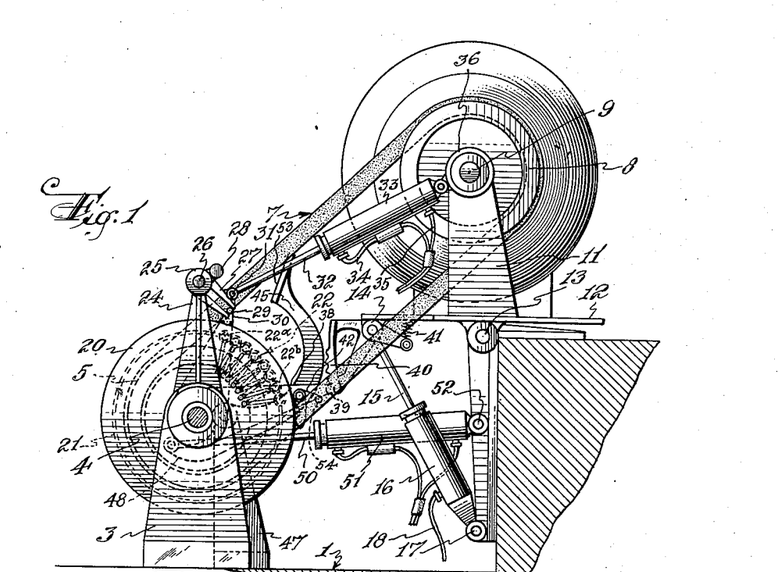
Figure 1 is a side elevation looking at one side of a structure showing the power unit driving a unit of any desired character, and with the parts in power-transmitting position.

The pivot 13 should be in a constant relation to the axial center of the shaft 4 and it will be noted that the center line of the driven shaft 9 is vertically off-center from the pivot 13 so that the weight of the driven unit will never be on dead-center and will assist in the movements which are to be later described. Connected to the platform 12, is a sleeve-like boss 14 to which is attached a piston rod 15 associated with a cylinder 16 pivoted at 17 to a portion of the support 1. The cylinder 16 may be supplied with compressed air, oil or the equivalent by the pipe 18 and a suitable valve (not shown) associated therewith.

The primary purpose of the piston 15, which is operated through the medium of its cylinder 16, is for returning and holding the driven unit in the position shown in Figure 1, although it can assist in tilting the driven unit about the pivot 13.

Figure 2:
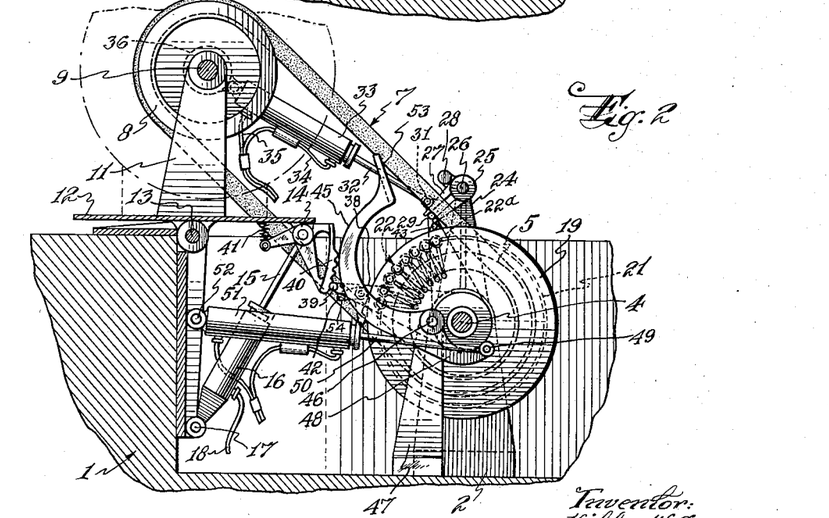
Figure 2 is a view of the structure shown in Figure 1 but looking at the reverse side.

Carried on the driving shaft 4, are two spaced discs 19 and 20 which are preferably not fixed thereto. Each of these discs has a raceway 21 therein within which are positioned the ends of rollers 22 having grooves 23 therein to receive at times the parts of the belt 7 where a V-belt is used. As shown in Figures 1 and 2, the rollers 22 are shown in their nested position, free from any contact with the belt and substantially centrally positioned on the line joining the axes of the driving and driven shafts.

The rollers 22 are held in this nested position by the following means: The support arm 3 has an upwardly extending portion 24 carrying at its upper end a bearing 25. The bearing 25 carries a pin 26 on which a bifurcated pawl 27 is adapted to rotate. The extending portion 24 has a lug 28 thereon to limit the movement of the pawl 27 in an upward direction. Positioned between the arms of the pawl 27 is a pin 29 connected to an arm 30 that is mounted freely on the shaft 4, one end of one of the rollers, which is numbered 22a, passing through the arm 30 into the raceway 21 of the disc 20. Pivotally connected at 31 to one of the fingers of the pawl 27 is a plunger 32 associated with an air or hydraulic cylinder 33 provided with pipes 34 and 35 so as to operate the plunger 32 in both directions. The cylinder 33 is pivotally mounted on a fitting 36 supported by the shaft 9.

Figure 3:
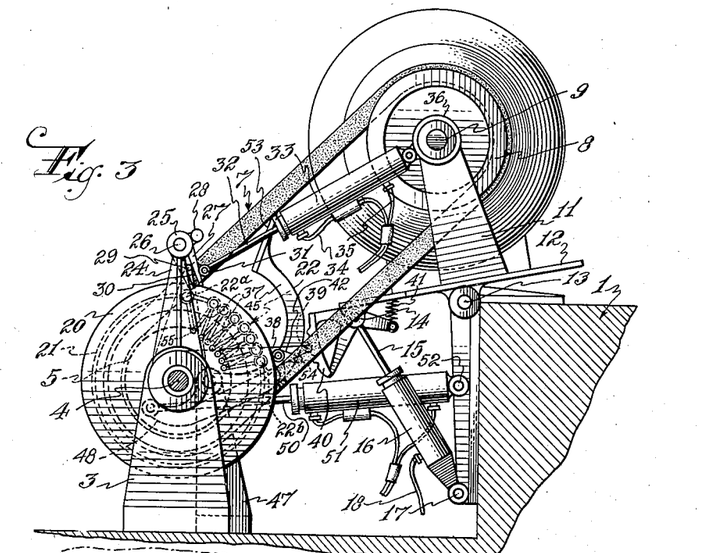
Figure 3 is a view similar to Figure 1 but showing the parts in a slightly different position; that is to say, in the first initial position of releasing the driven unit from the source of power.
Figure 4:
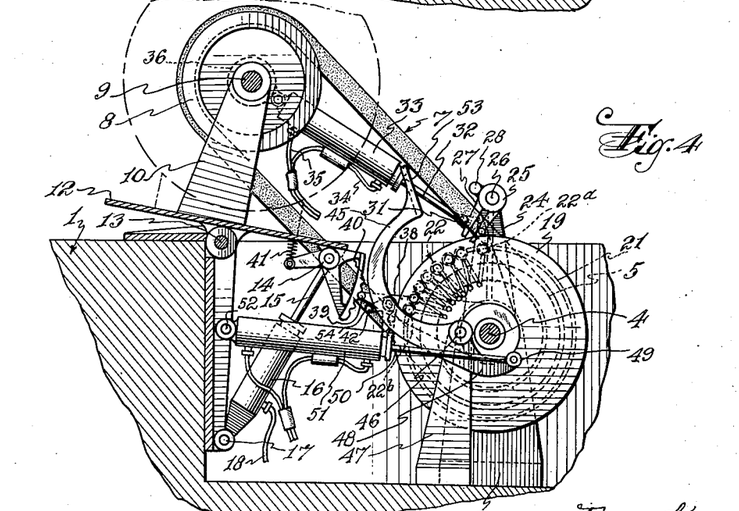
Figure 4 is a view of Figure 3 from the reverse side.

When the pressure in the cylinder 16 is released, the platform 12 starts to tilt as shown in Figures 3 and 4, and since at this particular moment the piston 32 does not move in the cylinder 33, the pawl 27 is moved to the position shown in Figures 3 and 4. This carries the arm 30 with it, as well as the roller 22a. It may be mentioned that all the rollers are connected by links 37, except the two end rollers 22a and 22b. Each link 37 is foldable about a joint 55.

Figure 12:
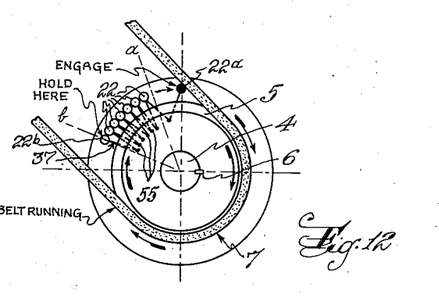
Figure 12 is a diagrammatic view of certain of the parts associated with the drive pulley as shown in Figure 4.
Figure 13:
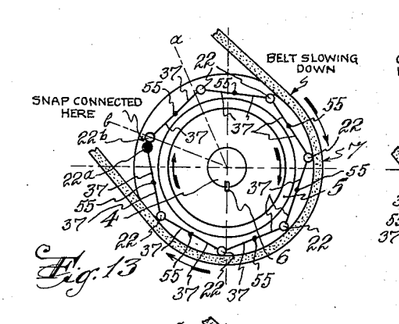
Figure 13 is a diagrammatic view of the parts associated with the drive pulley as shown in Figure 6.

As the roller 22a is moved, as just described, it is caused to engage the belt as shown in Figures 3, 4 and 12. The friction between the roller 22a and the belt 7 will drag the roller further under the belt and will start moving the next roller in the direction of the arrow shown in Figure 12 until the next roller is caught, and so on until all of the rollers are expanded into what I term a squirrel cage position as shown in Figure 13. While this is being done, the roller 22b—which passes through an arm 38 and into the raceway 21 of the disc 19—is held in the position shown in Figures 1-4 by the following means: The arm 38 is freely mounted on the drive shaft 4 and carries a pin 39 which is engaged by notches in a quadrant 40 pivotally mounted on the boss 14.

It will be noted that the quadrant 40 is held against the platform 12 by means of a compression spring 41 to tend to continuously hold the quadrant 40 in the position shown in all the figures.

Due to the fact that the shaft 4 is rotating in a clockwise direction in Figure 2, the arm 38 has the tendency to move from its initial position as indicated in Figure 4; however, the quadrant 40 will have moved downwardly in an arc such as to assist in maintaining the arm 38 in its initial position. Also pivotally mounted on the arm 38, is a catch pawl 42, the purpose of which will be later pointed out.

Figure 5:
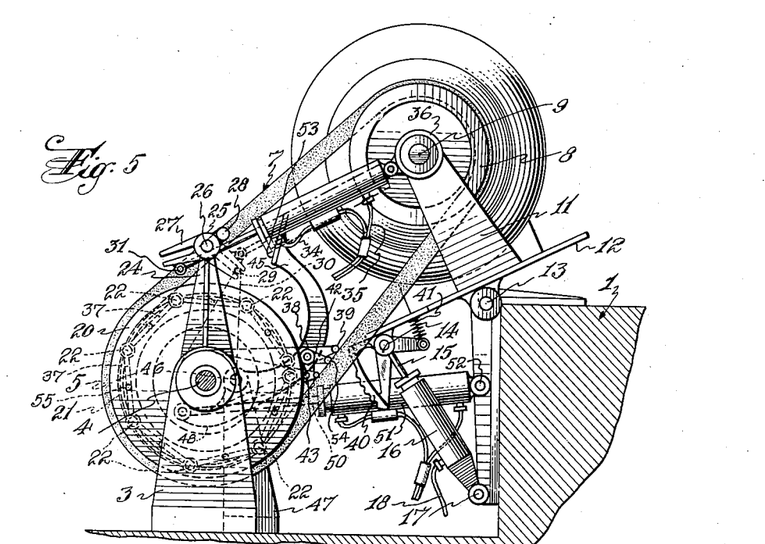
Figure 5 is a view of Figure 1 with the parts in the final step of completely unlocking the drive pulley from the driven pulley of the unit being operated.
Figure 6:
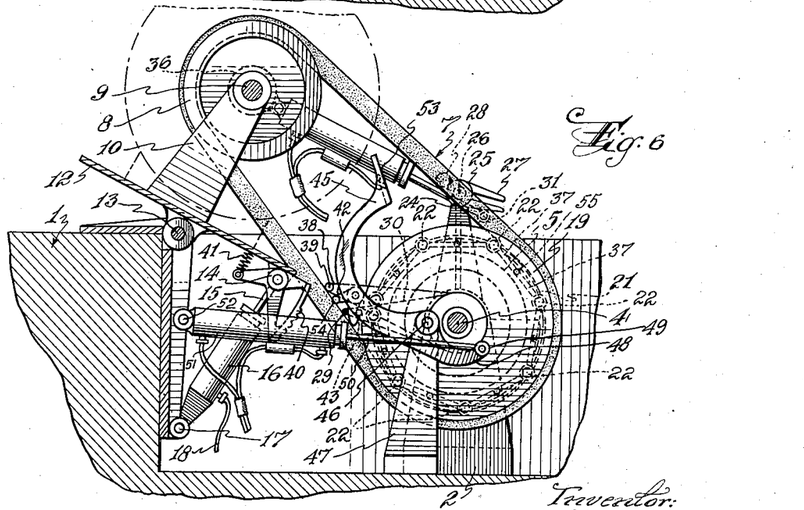
Figure 6 is a view similar to Figure 5 but from the reverse side.
Figure 7:
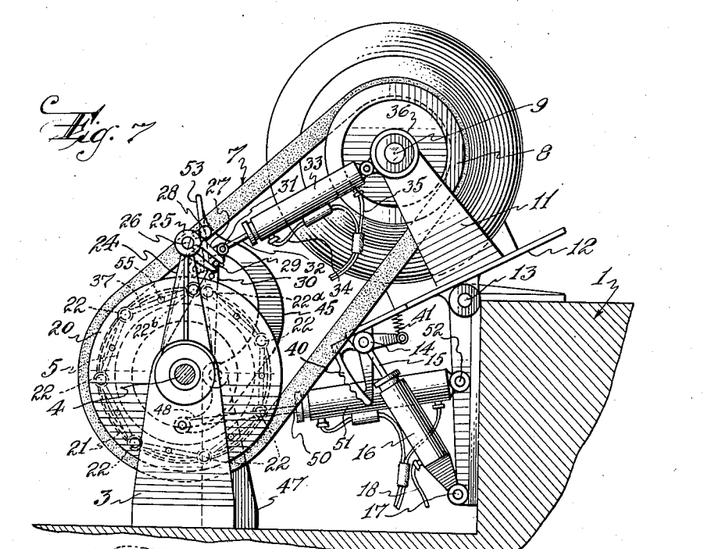
Figure 7 is a view of the parts shown in Figure 1 but with the first step in relocking of the drive pulley to the driven pulley.
Figure 8:
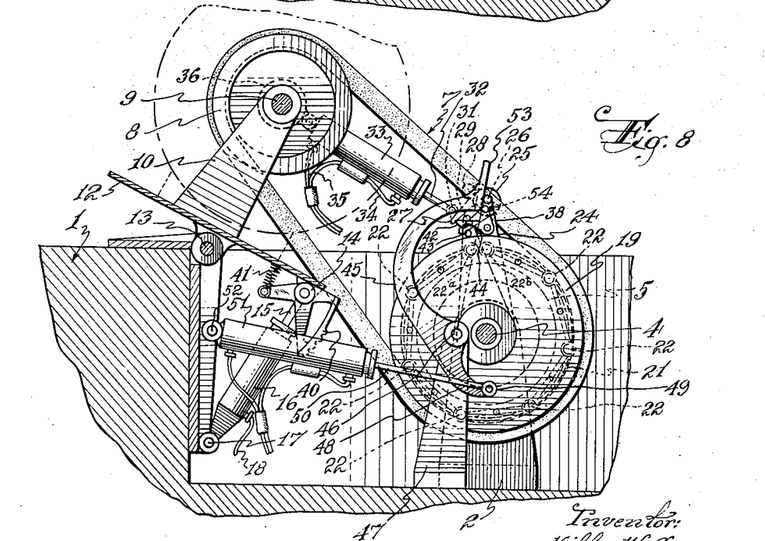
Figure 8 is a view of Figure 7 from the reverse side.
Figure 9:
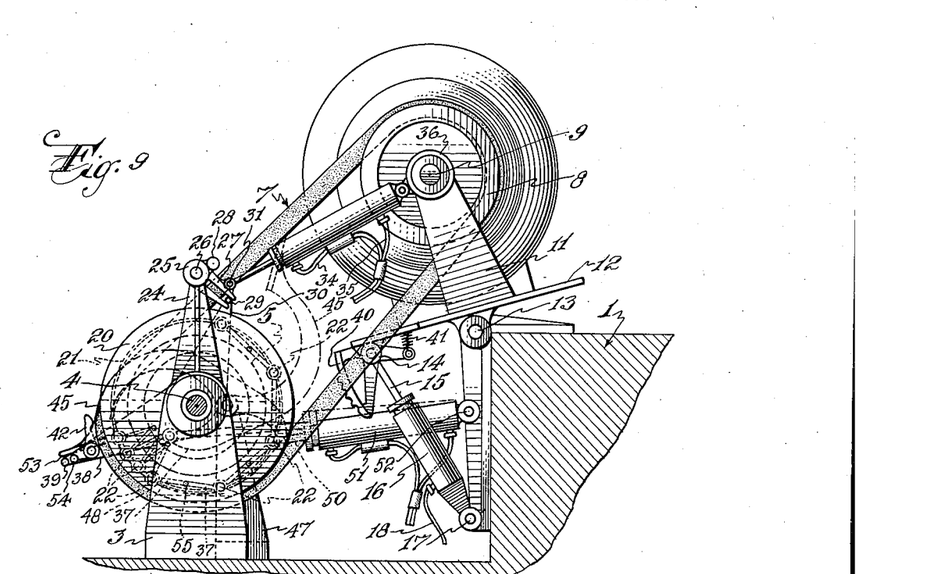
Figure 14:
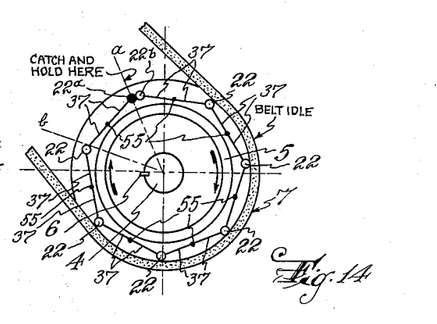
Figure 14 is a diagrammatic view of the parts associated with the drive pulley approximately as shown in Figure 8.

At the end of the tilting motion as shown in Figures 5 and 6, the pawl 27 is completely released from and out of the path of movement of the pin 29 so that the arm 30 is free to be rotated about the shaft 4 by reason of its attachment to the roller 22a. Simultaneously with the movement of the pawl 27, the quadrant 40 has been moved out of engagement with and out of the path of movement of the pin 39; and also, the catch pawl 42 engages an auxiliary pin 43 carried on an arm 44 which overlies the arm 30 but on the side adjacent the disc 19, and through which the other end of the roller 22a passes. This corresponds to the position of the rollers 22a and 22b in Figure 13. In this position it will be seen that the rollers 22 are in fully extended position forming what I term a squirrel cage, and are moving at substantially the speed of the belt at the time of its release from the driving pulley. As this support is throughout an arc of more than 180 degrees, all whipping of the belt is eliminated and the belt will begin to slow down and finally stop. Before the belt 7 comes to a stop, the cylinder 33 is actuated to cause its plunger 32 to withdraw the pawl 27 back to the position shown in Figure 1, or to the dotted position shown in Figure 5. so as to be in position to engage the pin 29 and hold the arm 30 when it reaches the proper position (see Figs. 7, 8 and 14).

Figure 11:
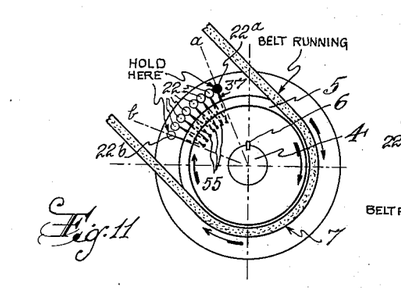
Figure 11 is a diagrammatical view of certain of the parts associated with the drive pulley as shown in Figure 2.
Figure 15:
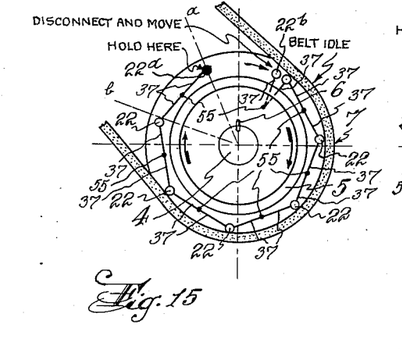
Figure 15 is a diagrammatic view of the parts associated with the drive pulley as shown in Figure 10, but at the starting position shown in Figure 10.
Figure 16:
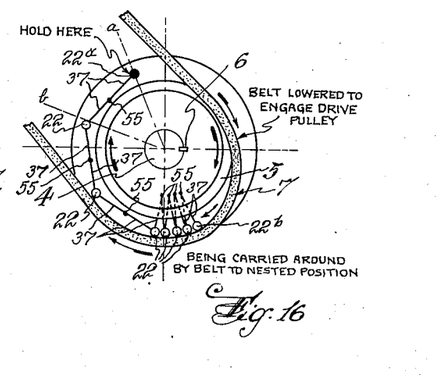
Figure 16 is a diagrammatic view of the parts associated with the drive pulley as shown in Figure 10, but in a still further position of operation.
Figure 17:
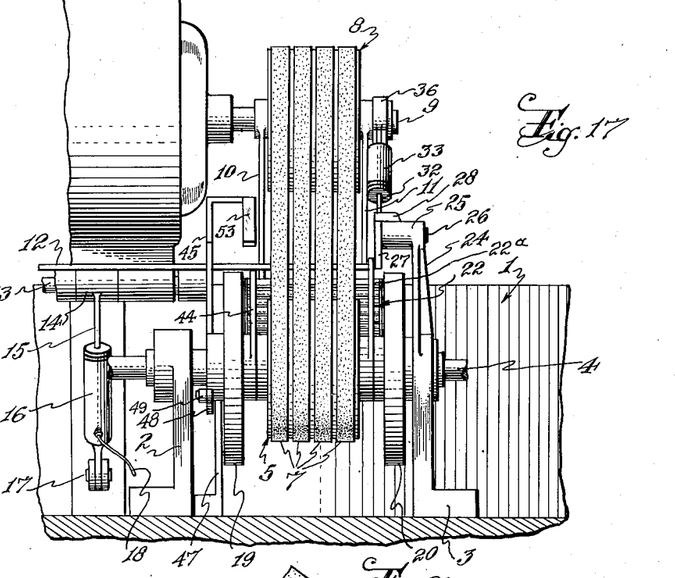
Figure 17 is an elevational view of Figure 1 looking in the direction of the arrow.
Figures 18, 19, 20:
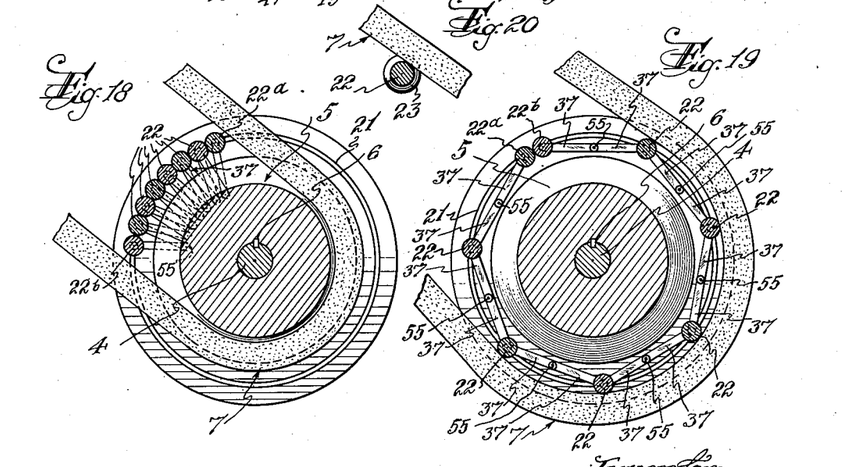
Figure 18 is a semi-diagrammatic view, part in section and part in elevation of the drive pulley showing the normal position of the belt and the releasing devices.
Figure 19 is a view similar to Figure 18 but with the releasing devices in fully released position so that the belt is free from the drive pulley.
Figure 20 shows the grooved rod with a section of the belt located therein.

In order to release the catch pawl 42 from the pin 43, I have provided an arcuately shaped arm 45 which is pivotally supported at 46 adjacent the shaft 4 on a support member 47. This arcuate arm 45 is provided at one end with an extension 48 having a pivotal bearing 49 to which is attached a piston 50 associated with a cylinder 51 that is pivotally supported at 52 to a part of the support 1. On energization of the cylinder 51 to draw the piston 50 inwardly, the lever 45 is operated so that the flat portion 53 thereof first engages the pin 54 on the catch pawl 42, moving the catch pawl so as to release the pin 43. As the lever 45 further moves, it engages the pin 39 that was initially in engagement with the quadrant 40 and this carries the arm 38, carrying the roller 22b, around in a clockwise position, referring to Figure 8 and as shown in Figure 15 and also in Figure 16, whereby the belt 7 moves downwardly into engagement with the pulley as shown in Figure 16. Simultaneously therewith, the cylinder 16 is energized to move the platform 12 toward its horizontal position, thereby acting to tighten the belt 7 and to bring the squirrel cage mechanism back to its initial position as shown in Figures 1, 2 and 11, with the rollers 22 located between the lines a and b.

Figure 10:
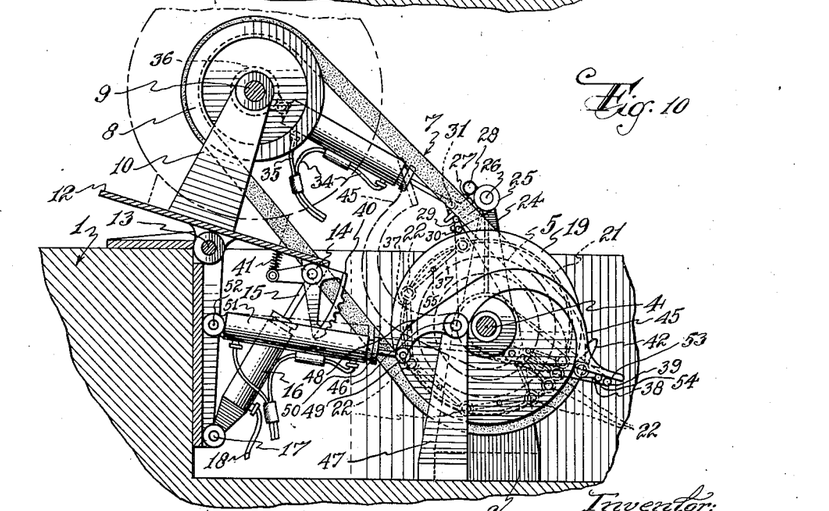
Figure 10 is a view of Figure 9 from the reverse side.

Immediately the piston 50 has moved the arm 45 to the position shown in Figure 10, the arm 45 must be immediately moved back to the position shown in the dotted lines and this is done by energizing the cylinder 51 in reverse direction.

Thus all parts are brought back to normal position and it goes without saying that all of these parts must be moved in proper timed relation.

It will be obvious that many of the details may be varied without departing from the spirit of my invention or the scope of the appended claims.

What I claim is:

1. Releasing mechanism for a power take-off structure including driving and driven shafts with pulleys thereon and supports therefor and belt means for running over the pulleys, means comprising rotatable members normally out of contact with the belt but insertible between the driving pulley and the belt by the belt on bringing one of said rotatable members into contact with the belt, means for initially bringing said one rotatable member into contact with the belt, said rotatable members being finally spaced from the pulley at a plurality of arcuately spaced points around a greater part of the circumference of the pulley for lifting and holding the belt from the pulley with means for locking said rotatable members in this position, means for releasing said locking means and allowing the rotatable members to contact with the belt whereby the belt will contact with the driving pulley and return said rotatable members to normal position.

2. Releasing mechanism for a power take-off structure including driving and driven shafts with pulleys thereon and supports therefor and belt means for running over the pulleys, means including a set of rollers connected by movable links except the two end rollers are not directly linked to each other, the rollers being normally in a nested position but movable for engaging said belt, means for engaging one end roller with the belt whereby said engagement will serve to move the rollers into spaced relationship around the driving pulley as defined by the links, means for supporting the rollers in spaced relation away from the outer periphery of the driving pulley to thereby move and hold the belt out of contact with the pulley and means for allowing the belt to come back into contact with the pulley and to move the rollers and links back to foldable position.

3. Releasing mechanism for a power take-off structure as set forth in claim 2 further defined in that the roller ends are supported in raceways provided in discs located at opposite ends of the driving pulley.

4. Releasing mechanism for a power take-off structure as set forth in claim 2 further defined in that the roller ends are supported in raceways provided in discs located at opposite ends of the driving pulley, and further defined in that the rollers are connected together by jointed links which will allow the rollers to be folded together into a nest and expanded into a cage-like device with means for locking the cage while the belt is held in released position from the pulley.

5. Releasing mechanism for a power take-off structure including driving and driven shafts with pulleys thereon and supports therefor and belt means for running over the pulleys, an expansible and collapsible mechanism positioned between opposite running sides of the belt and adjacent the driving pulley, means for normally holding said mechanism in collapsed position away from the belt while power is being transmitted by the belt, means for releasing said holding means and moving a member of said mechanism into contact with the belt whereby the belt will move other members of said mechanism into expansible position in contact with the belt thereby lifting the belt entirely from the driving pulley, means for locking said belt engaging members in their expansible position means for releasing said locking means and moving at least one of said members into contact with the belt whereby the belt will collapse said mechanism and return it to normal position for engagement with said normal holding means.

6. Releasing mechanism for a power take-off structure as set forth in claim 5 further characterized in that said collapsible mechanism includes a plurality of rollers supported at their ends in members having circular raceways and connected in chain-like formation by jointed links.

7. Releasing mechanism for a power take-off structure as set forth in claim 5 further characterized in that said collapsible mechanism includes a plurality of rollers supported at their ends in members having circular raceways and connected in chain-like formation by jointed links, and further characterized in that said normally holding means includes a bifurcated pawl and an arm freely carried on the driving pulley shaft, the arm having a pin normally located between the fingers of the holding pawl, one end roller going through said arm so as to carry the arm with it around the shaft and means for moving the pawl out of engagement with the pin and at the same time moving the arm so the roller going through it will be moved into contact with the belt and thereby start the said expansible operation.

8. Releasing mechanism for a power take-off structure as set forth in claim 5 further characterized in that said collapsible mechanism includes a plurality of rollers supported at their ends in members having circular raceways and connected in chain-like formation by jointed links, and further characterized in that said normally holding means includes a bifurcated pawl and an arm freely carried on the driving pulley shaft, the arm having a pin normally located between the fingers of the holding pawl, one end roller going through said arm so as to carry the arm with it around the shaft, and still further characterized in that said locking means includes; another arm freely carried on the driving pulley shaft, the arm pivotally carrying a catch pawl which has a release pin fastened thereto, and still another arm freely carried on the drive shaft on the opposite side of the pulley from the arm carrying the holding pawl and overlying this last mentioned arm, the said end roller also going through this overlying arm so both arms move together, this overlying arm having a pin positioned to be engaged by the catch pawl when the link chain is extended so the two end rollers are brought adjacent each other and means for operating the catch pawl to release the roller held thereby and start the collapsible movement around the drive pulley thereby allowing the belt to come back onto the pulley.

9. Releasing mechanism for a power take-off structure including driving and driven shafts with pulleys thereon and supports therefor and belt means for running over the pulleys, means for moving the belt completely out of contact with the driving pulley, said means including a set of rollers connected together by foldable links except the two end rollers are not directly linked to each other so as to be normally nested between opposite parts of the belt adjacent the driving pulley, means for engaging one of the end rollers for causing the rollers to move out of their nested position and take up arcuately spaced positions around the pulley but between it and the belt and away from the pulley, means for locking the end rollers in this extended position and further means for releasing the lock and moving the rollers so the belt will engage the pulley and carry the rollers and links back to nested position.

10. Releasing mechanism for a power take-off structure as set forth in claim 9 further characterized in that means are provided for causing the structure carrying the driven pulley to automatically shift its position so as to loosen the belt with further automatical means for simultaneously acting on the rollers to start their movement out of the nest for the purpose described.

KIBBEY W. COUSE.

REFERENCES CITED

The following references are of record in the file of this patent:

UNITED STATES PATENTS

| Number | Name | Date |
| --- | --- | --- |
| 268,051 | Stevens | Nov. 28, 1882 |
| 367,891 | Canning | Aug. 9, 1887 |